United States Patent [19]

Vanzant et al.

[11] Patent Number: 4,575,161

[45] Date of Patent: Mar. 11, 1986

[54] ANTI-SPIN DEVICE

[76] Inventors: Teddy L. Vanzant, 3060 Kips Korner, Norco, Calif. 91760; Karol W. Vanzant, 1518 N. Freeman, Santa Ana, Calif. 92704

[21] Appl. No.: 639,626

[22] Filed: Aug. 10, 1984

[51] Int. Cl.⁴ .............................................. B60T 8/06
[52] U.S. Cl. .................................... 303/110; 303/116
[58] Field of Search ..................... 188/181 A, 181 C; 303/12, 93, 96, 106, 110, 113, 116, 119; 180/197

[56] References Cited

U.S. PATENT DOCUMENTS

| | | | |
|---|---|---|---|
| 2,346,175 | 4/1944 | Matson | 188/152 |
| 2,583,307 | 1/1952 | Schneider | 74/711 |
| 3,130,805 | 4/1964 | Carter et al. | 180/14 |
| 3,169,595 | 2/1965 | Shepherd . | |
| 3,264,039 | 8/1966 | Cadiou | 303/6 |
| 3,264,040 | 8/1966 | Brueder . | |
| 3,288,232 | 11/1966 | Shepherd . | |
| 3,400,776 | 9/1968 | Smith | 180/33 |
| 3,463,555 | 8/1969 | Ryskamp . | |
| 3,586,385 | 6/1971 | Flores et al. . | |
| 3,599,014 | 8/1971 | Carp | 307/233 |
| 3,617,099 | 11/1971 | Sugiyama . | |
| 3,706,351 | 12/1972 | Neisch | 303/96 |
| 3,773,364 | 11/1973 | Michellone et al. | 303/110 |
| 3,779,331 | 12/1973 | Burckhardt et al. | 180/82 R |
| 4,006,417 | 2/1977 | Pace | 324/166 |
| 4,066,300 | 1/1978 | Devlin | 303/96 |
| 4,156,547 | 5/1979 | Marsh | 303/96 |
| 4,206,950 | 6/1980 | Elliott | 303/110 |
| 4,480,877 | 11/1984 | Resch | 303/116 |
| 4,483,421 | 11/1984 | Kennelly | 303/12 X |

Primary Examiner—Duane A. Reger
Attorney, Agent, or Firm—Gausewitz, Carr and Rothenberg

[57] ABSTRACT

Spinning of one of a pair of powered vehicle wheels is prevented by anti-spin cylinders connected between the master cylinder and each wheel cylinder. In normal operation, brake fluid passes through the anti-spin cylinders from the master cylinder to the wheel cylinders. If a differential rotational speed of the wheels is detected, one or the other of the anti-spin cylinders is operated to close its connection to the master cylinder, and to pressurize the brake fluid in the anti-spin cylinder so as to brake the spinning wheel. In one embodiment, pistons of first and second anti-spin cylinders are connected to be alternatively driven by a single double-acting vacuum-actuated diaphragm, with the diaphragm and anti-spin cylinders compactly packaged partly within the housing of a vacuum accumulator that drives the anti-spin cylinders. In a second embodiment, a reversible pump is employed to drive the pistons of one or the other of the anti-spin cylinders by means of three-way solenoid valves selectively operated according to a detected difference in rotational velocity of the driving wheels.

22 Claims, 10 Drawing Figures

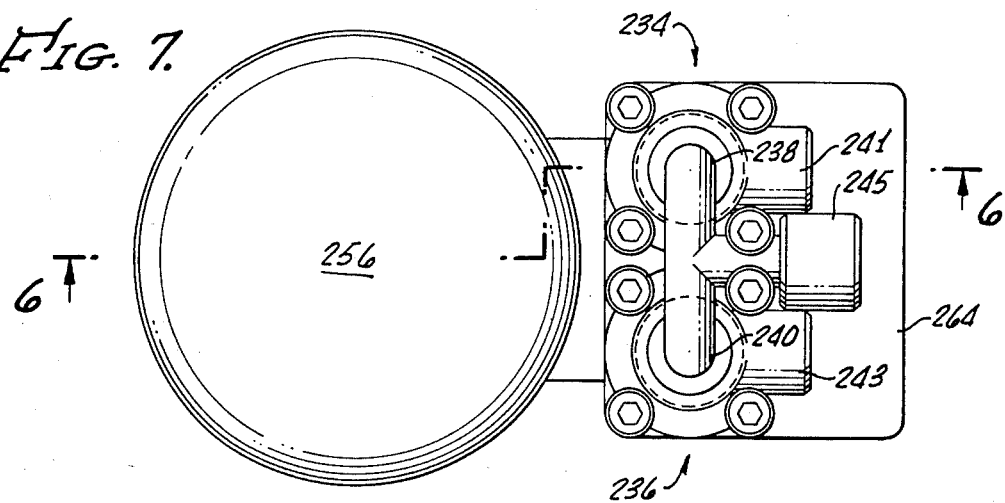
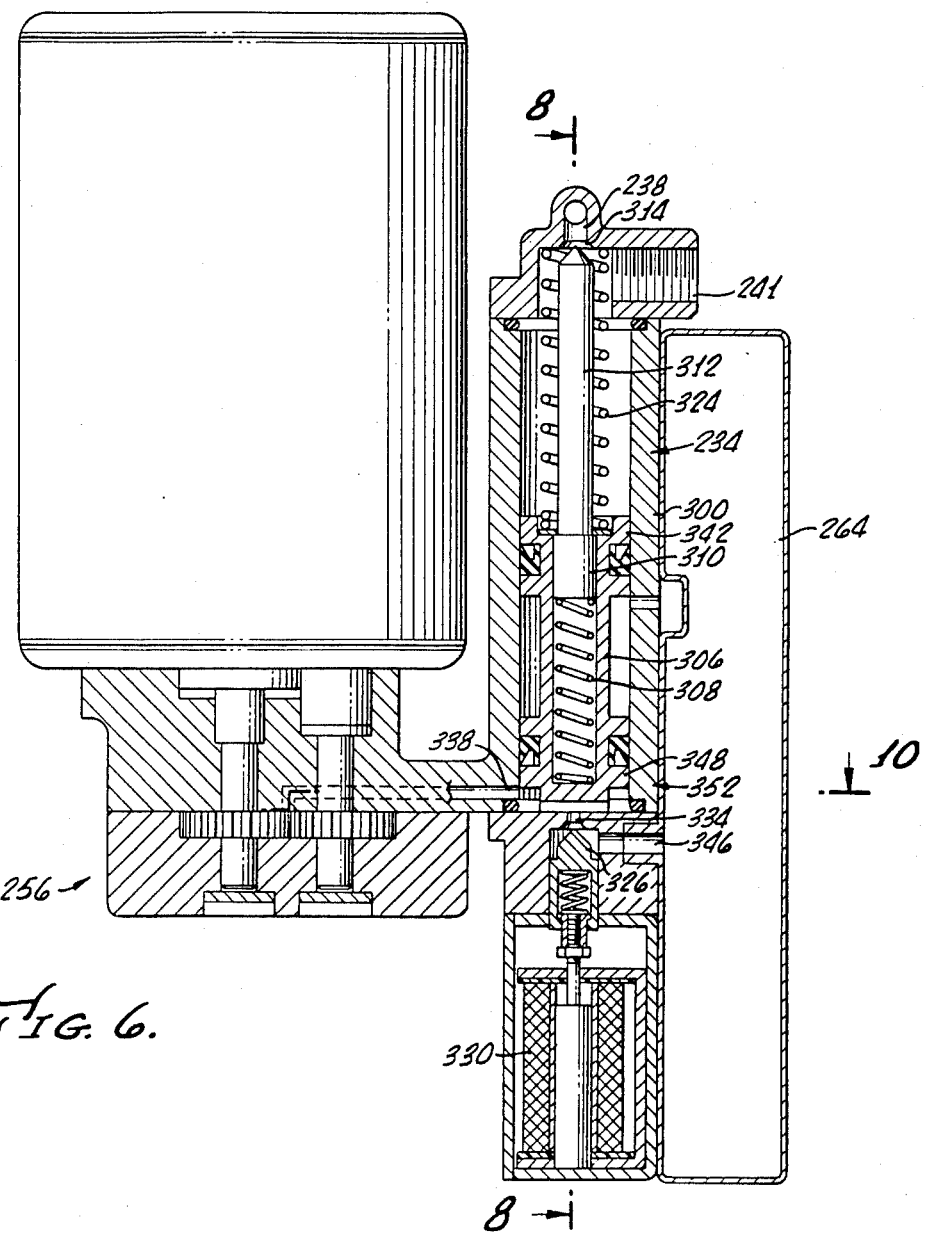

ANTI-SPIN DEVICE

BACKGROUND OF THE INVENTION

The present invention relates to anti-spin devices, and more particularly concerns a simple and improved system for automatically braking the spinning one of a pair of power wheels that are driven through differential gearing.

A major problem with the differential gearing commonly employed to drive power wheels of a vehicle, such as a passenger automobile, or truck, or the like, is the fact that all power may be transmitted to that one of the driven wheels experiencing less resistance to rotation. Thus, it may be difficult or impossible to accelerate a vehicle if one of its drive wheels is in contact with a low friction surface, such as sand, mud, ice, or the like, even though the other of its drive wheels has a good frictional engagement with a solid, non-slip surface. In such a situation, application of power to the wheels through the differential results merely in the spinning of the wheel resting on the low-friction surface. Widespread and intensive efforts over a period of many years have resulted in a number of proposed solutions to the problems of wheel skid and spin, some of which are shown in U.S. Pat. Nos. 4,156,547, 2,583,307, 3,288,232, 4,006,417, 4,066,300, 3,599,014, 2,346,175, 3,779,331, 3,586,385, 3,617,099, 3,706,351, 3,130,805, 3,169,595, 3,463,555, 3,264,040, and 3,264,039. These patents, and other proposed solutions, have involved various devices for sensing differential rotational speeds of the driven wheels, and mechanical, hydraulic or electromechanical arrangements for eliminating or minimizing skidding or spinning. Many of the prior patents are concerned with wheel slipping while braking, attempting to avoid wheel lock-up that may cause skidding, but failing to solve the problem of wheel spin upon acceleration. Despite such efforts, a most commonly employed anti-spin mechanism is a non-skip differential that provides only a limited solution to the problem by means of mechanical arrangements within the differential gearing. Other proposed solutions to the wheel spinning problem are not employed and have not been successful for a number of reasons. Prior devices have been complex, costly and difficult to operate and maintain. Where apparatus is in any way connected with the braking of a vehicle, reliability and safety considerations are of the utmost importance. Therefore, devices of the prior art cannot be accepted if they tend to, or are likely to, compromise reliability, safety and maintainability to existing braking systems.

Accordingly, it is an object of the present invention to provide an anti-spin device that eliminates or minimizes problems of the prior art.

SUMMARY OF THE INVENTION

In carrying out principles of the present invention in accordance with a preferred embodiment thereof, first and second spin controls are connected between the master cylinder and respective ones of the brake cylinders of a vehicle in which power wheels are driven by differential gearing. The spin control includes an anti-spin cylinder, and an anti-spin piston. An input port in the anti-spin cylinder, connected to the master cylinder, is arranged to be closed upon motion of the piston which is driven in response to a sensed difference in rotational speed of the powered wheels. According to a feature of the invention, the pistons of first and second anti-spin cylinders are selectively driven by a double-acting vacuum-actuated diaphragm connected to drive one or the other of the pistons. According to another feature of the invention, the anti-spin cylinders may be selectively and alternatively driven by drive pistons which, in turn, are selectively actuated by a reversible pump and a pair of selectively actuated valves.

BRIEF DESCRIPTION OF THE DRAWINGS

FIG. 6 is a sectional elevational view of an anti-spin control employed in the system of FIG. 5;

FIG. 7 is a bottom view of the apparatus shown in FIG. 6;

DETAILED DESCRIPTION OF THE PREFERRED EMBODIMENTS

Figure 1:
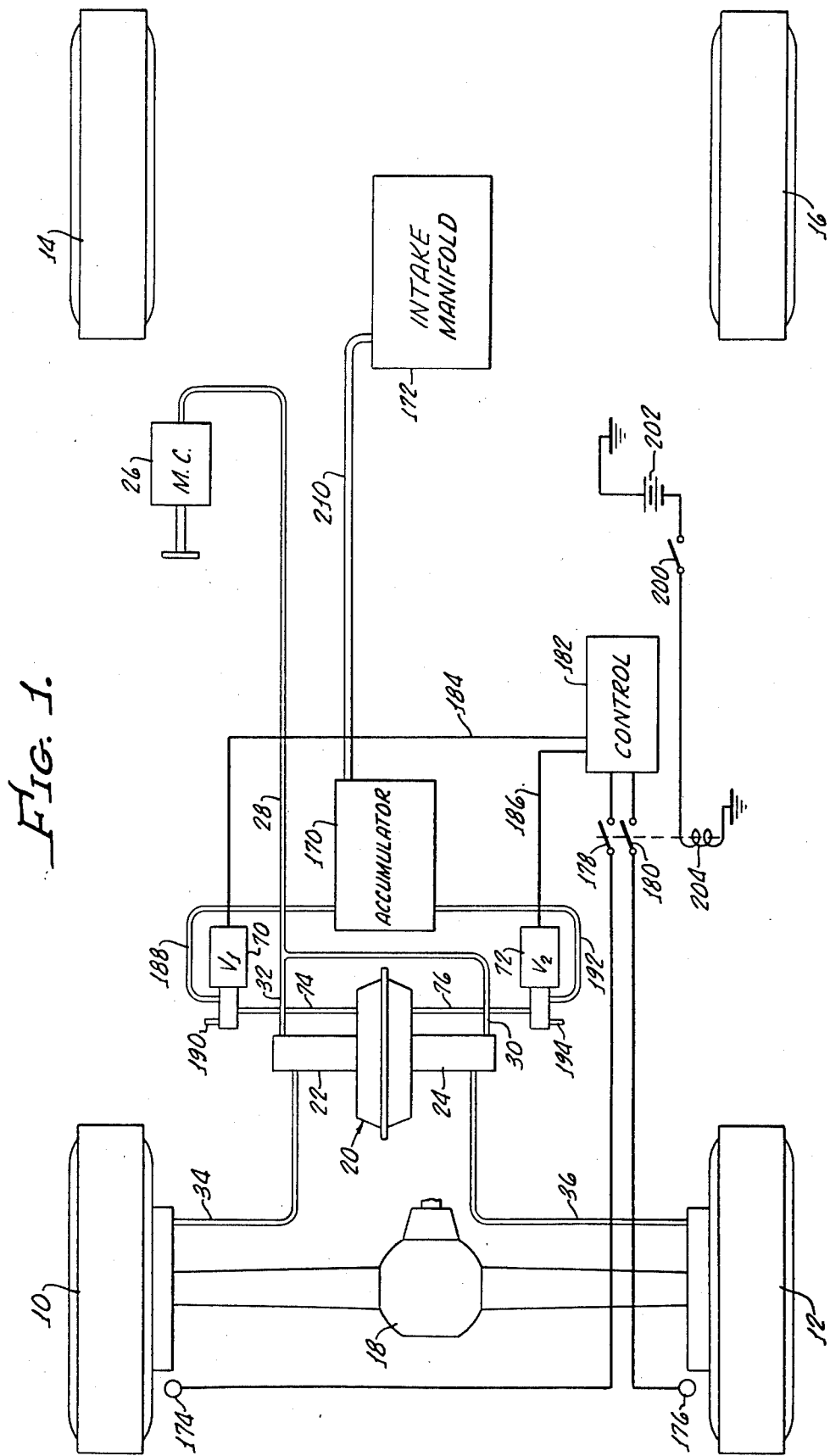
FIG. 1 is a schematic illustration of an anti-spin system embodying principles of the present invention.

Shown in FIG. 1 are the wheels 10, 12, 14 and 16 of a conventional vehicle, such as a passenger automobile, for example, of which drive wheels 10 and 12 are driven via a differential gear box 18 which may permit one or the other of the wheels to spin upon application of power if such wheel is on a low-friction surface. An anti-spin system, according to one embodiment of the present invention, is provided to automatically sense the spinning of one wheel when power is applied, and separately and independently apply a braking force to the spinning wheel. To this end, there is provided a double-acting vacuum diaphragm assembly 20 connected to operated pistons (not shown in FIG. 1) of anti-spin cylinders 22, 24 that are mounted to the diaphragm housing. Fluid from a vehicle master cylinder 26 is applied to the conventional wheel cylinders (not shown) by means of a conduit section 28 which branches, as at 30 and 32, to flow into and through the anti-spin cylinders 22, 24 in a manner to be described in detail below. Brake fluid flowing through the anti-spin cylinders then flows through conduits 34, 36 to the respective wheel cylinders.

Figure 2:
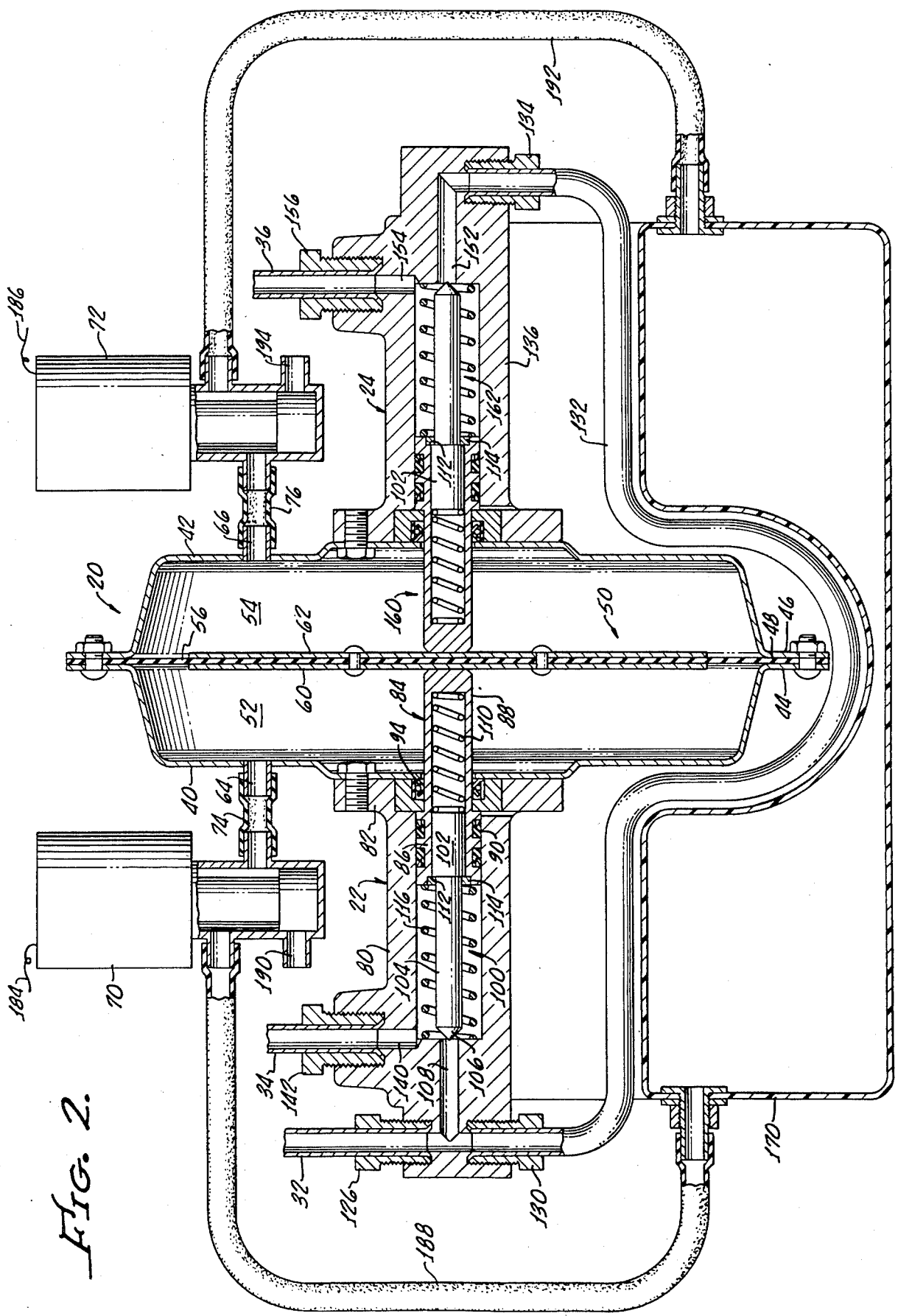
FIG. 2 is a sectional view showing a double-acting diaphragm and anti-spin cylinders embodied in the system FIG. 1.
Figure 3:
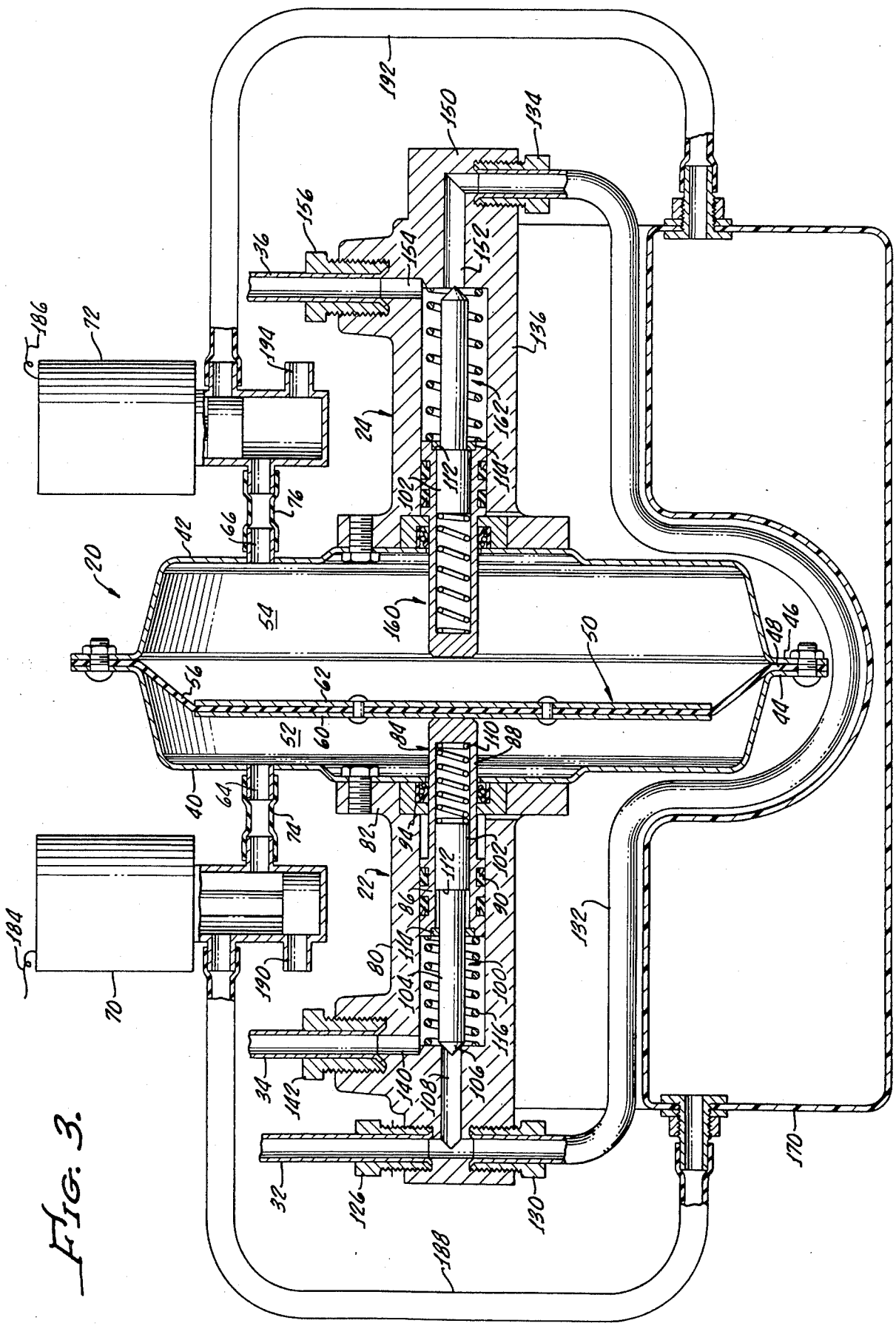
FIG. 3 shows the apparatus of FIG. 2 with one of the anti-spin cylinders operated by the diaphragm.

Structure of the anti-spin cylinders and double-acting diaphragm assembly is illustrated in FIGS. 2 and 3. Diaphragm assembly 20 comprises a diaphragm housing having first and second spaced and opposed sidewalls 40, 42, each having a circumferential flange 44, 46 which are bolted together to clamp and seal therebetween the peripheral edge 48 of a diaphragm combination, generally indicated at 50, which extends completely across the diaphragm housing, dividing it into first and second air-tight diaphragm pressure chambers 52 and 54. The diaphragm combination is formed of an air impervious, flexible, resilient and extensible membrane 56, to opposite sides of the central portion of which are rigidly secured first and second stiffener plates 60, 62. First and second vacuum fittings 64, 66 are connected for communication with the interior of the housing to connect chambers 52, 54, respectively, to respective ones of a pair of three-way solenoid-operated valves 70, 72 (FIG. 1), by means of conduits 74, 76.

Anti-spin cylinder 22 comprises an elongated cylindrical body 80 having an inner end 82 bolted to the diaphragm housing wall 40, and having a bore in which is mounted a piston generally indicated at 84. The piston includes a hollow piston head 86 slidably sealed to, and within the cylinder body 80, and an integral piston rod section 88 extending from the piston head through the inner end of the cylinder body into a free, abutting contact with a surface of diaphragm plate 60. Seals, such as 90, 94, are provided to block leakage of fluid from the interior of the cylinder 22.

Slideably mounted in the hollow piston head 86 is a valve actuator 100 having an enlarged rear section 102 slidably received within the hollow piston head, and having a decreased diameter rod section 104 which terminates in a conical valve closure surface 106 that is adapted to seat upon a conical valve seat of an input port 108 formed in and extending through the outermost or free end of cylinder body 80.

A spring 110 mounted within piston rod section 88 abuts the inner end of the valve actuator and urges it outwardly of the piston (toward the left as viewed in FIG. 2) to a limiting position defined by abutment of a valve actuator shoulder 112 with a snap ring 114 fixed to the end of the piston head 86. A return spring 116 in the cylinder body urges the piston inwardly (toward the right as viewed in FIG. 2) to a cylinder unpressurized position. A T-fitting 120 has a leg 122 threadedly engaged in a threaded opening in the free end of cylinder body 80, and includes a passage 124 communicating with the input port 108. A first arm 126 of the T-fitting 124 is connected by conduit 32 to the master cylinder 26 of the vehicle. A second arm 130 of the T-fitting is connected by a conduit 132 to a comparable L-fitting 134 threaded in the outer end of a cylinder body 136 of the second anti-spin cylinder 24.

An output port 140 is formed in the free end of the cylinder body 80 and communicates with a fitting 142 threadedly affixed to this end of the cylinder body and connected to conduit 34 that is arranged to flow fluid from the interior of the cylinder body 80 to the wheel cylinder of wheel 10.

Anti-spin cylinder 24 is substantially identical in construction, arrangement and function to the anti-spin cylinder 22, excepting only that instead of a T-fitting 120, cylinder 24 has L-fitting 134 of which a leg 150 threadedly connected to an input port 152 of cylinder body 136. An output port 154, extending through the cylinder body communicates with an output fitting 156 to which is secured the conduit 36 that connects this anti-spin cylinder 24 to the wheel cylinder of wheel 12. As mentioned above, the second anti-spin cylinder 24, except for the modification in the end fitting 134 and its different location on the diaphragm housing, is identical to the anti-spin cylinder 22, including a piston 160 that abuts a surface of stiffener plate 64 to the diaphragm, and a slideably mounted valve actuator 162 that will close input port 152 when the piston is driven toward a cylinder pressurizing position (toward the right as viewed in FIG. 2). The anti-spin cylinders outwardly of the piston heads are filled with brake fluid, which flows to the anti-spin cylinders from the master cylinder.

Vacuum is normally applied (in the absence of sensed spinning of one of the wheels, or when the anti-spin system is off) to both sides of diaphragm combination 50 from a vacuum accumulator 170 (FIG. 1) which is connected to a vacuum source such as the intake manifold 172 of an engine. Wheel velocity sensors 174, 176 sense the rotational speed of each wheel, and generate electrical signals having a magnitude or repetition rate proportional to such velocity. These signals are sent via ganged switches 178, 180 to a control 182 which compares the two speed signals. The control 182 produces an output signal on a line 184 when the speed of one of the wheels is a selected amount, such as for example, 20% greater than the speed of the other, and produces an output signal on a line 186 when the speed of the second wheel exceeds that of the first wheel by the same amount. Thus, the signal on line 186, for example, indicates that wheel 10 is spinning. This signal is sent to the three-way solenoid valve 72 which is operated to block a line 192 connecting this valve to the accumulator and to open the valve to a conduit 194 that connects the valve interior to atmosphere. Accordingly, atmosphere pressure is applied through the valve 72, conduit 76, and fitting 66 to one side of the diaphragm, thereby displacing and stretching the diaphragm and driving piston 84 to the pressurizing position shown in FIG. 3. As the piston moves toward its pressurizing position, the conical surface of the end of valve actuator 104 seats in the input port 108 to thereby block flow of fluid from the master cylinder. The valve operator is held in position to maintain the input port closed by compression of the spring 110. After the input port has been closed, piston 84 will continue to move through a small amount to its pressurizing position, thereby pressurizing the fluid which fills the interior of cylinder body 80, and thus applying pressure fluid via conduit 34 to the wheel cylinder of the spinning wheel 10.

When the differential wheel rotational speed is less than 20%, the signal on line 186 is no longer fed to the valve 72, whereupon the valve returns to its normal condition in which line 194, to atmosphere, is blocked and in which a path is provided for communication of vacuum from the accumulator 170 to diaphragm chamber 54. If wheel 12 rather than wheel 10 is spinning, the signal sent to control 182 from the sensors causes the control to provide an output on line 184 which operates the valve 70, causing this valve to block a conduit 188 connecting this valve to the accumulator and to open a conduit 190 that connects the valve to atmosphere. Diaphragm chamber 52 is thereby pressurized (with atmospheric pressure) while chamber 54 remains under the lower pressure of the accumulator. Thus, the piston of anti-spin cylinder 24 is driven toward its pressurizing position, blocking flow of fluid from the master cylinder to the wheel cylinder of wheel 12 and causing the anti-spin cylinder 24 to apply a pressurized fluid via conduit 36 to the wheel cylinder of wheel 12.

Switches 178, 180 between the velocity sensors and control 182 are normally open and, thus, the anti-skid system is disabled. Normal operation of the brake pedal will cause the master cylinder to apply pressure to all of the wheel cylinders, the pressurized fluid being applied to wheels 10 and 12 via the input and output ports of the now disabled anti-spin cylinders. The input ports of the of the anti-spin cylinders are held open because the piston return springs 116 drive the pistons to extreme unpressurized position in which the snap rings 114 fixed to the pistons engage the shoulders on the valve operators to ensure that these are retracted from the input ports of the anti-spin cylinders. If one of the pistons should become stuck in a pressurizing position, the slidable mounting of the valve operator within the hollow piston allows the valve operator to be driven (by operation of the master cylinder) inwardly of the piston. Thus, pressure on the brake pedal to apply pressurized fluid from the master cylinder to the input port 108 will drive the valve operator from the input port to enable flow of fluid through the anti-spin cylinder, and thus provide normal brake operation. In this manner, normal operation of the brake via the brake pedal and master cylinder will readily override any actuation of the anti-spin system, thus providing increased safety.

It is not possible for the system to lock up both drive wheels simultaneously because the double acting diaphragm assembly inherently is capable of driving only one anti-spin piston at a time. The magnitude of fluid pressure applied by the anti-spin system is chosen by selection of the relative areas of diaphragm, piston and output ports. The described anti-spin system is energized or enabled by closing a manually-operated switch 200 which thereupon provides power from a source, such as battery 202, to a coil 204 that will close both of normally open ganged switches 172, 180, thereby enabling the system.

Figure 4:
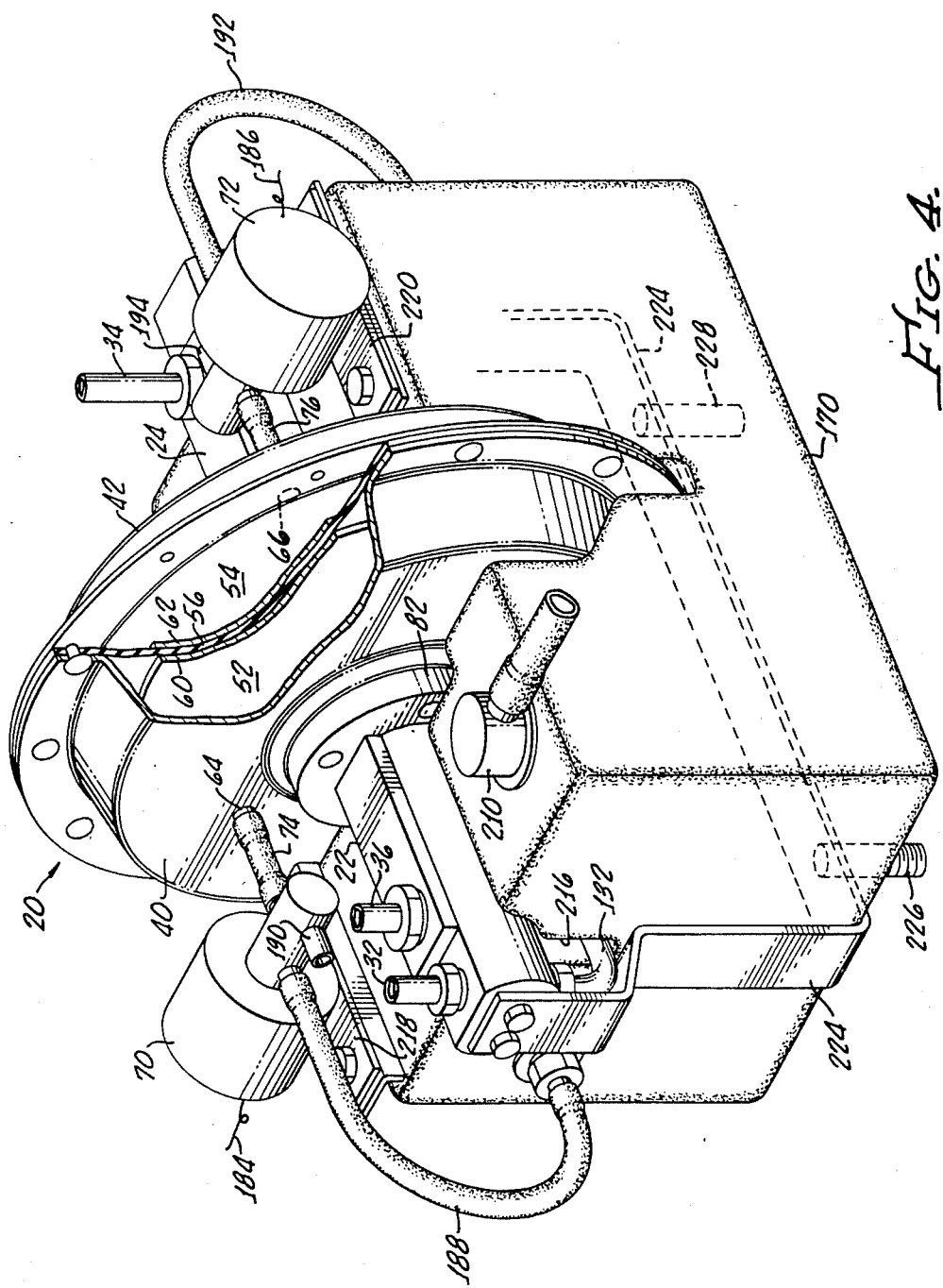
FIG. 4 is a pictorial view, with parts broken away, showing the physical arrangement of certain component parts of the system of FIGS. 1–3.

It will be readily appreciated that the several components may be mounted in many different locations on a vehicle. It is presently preferred to arrange the major units of the system in a compact, simplified package in the form illustrated in FIG. 4. Thus, as shown in this figure, accumulator 170 is formed as a substantially rectangular plastic container having an input check valve 210 connecting the interior of the accumulator to the vacuum source. The accumulator housing is formed with a relatively deep transverse external recess 212 which receives a lower half of the diaphragm assembly 20. Longitudinally extending, upwardly facing external recesses, such as recess 216, in the upper portion of the accumulator housing receive portions of the anti-spin cylinders 22 and 24. These longitudinal recesses are also configured to receive and guide the conduit 132 that extends from the free end of cylinder 22 to and around the diaphragm to the input of cylinder 24. Valve mounting brackets 218, 220 are fixed to the upper side of the accumulator housing on opposite sides of the diaphragm, and fixedly mount the three-way solenoid valves 70, 72, each of which, as previously described, is arranged to couple the respective diaphragm pressure chamber with either the interior of the accumulator or atmosphere. A rigid mounting strap 224 has its end bolted to the free ends of the anti-spin cylinders 22 and 24, respectively, and extends snugly down along both ends of the accumulator housing and along the bottom of the accumulator housing, carrying fixed threaded bolts 226, 228 by means of which the entire compact assembly of accumulator, diaphragm, anti-spin cylinders and solenoid valves may be readily mounted. The straps also fixedly secures the diaphragm assembly and anti-spin cylinders to the accumulator housing.

Figure 5:
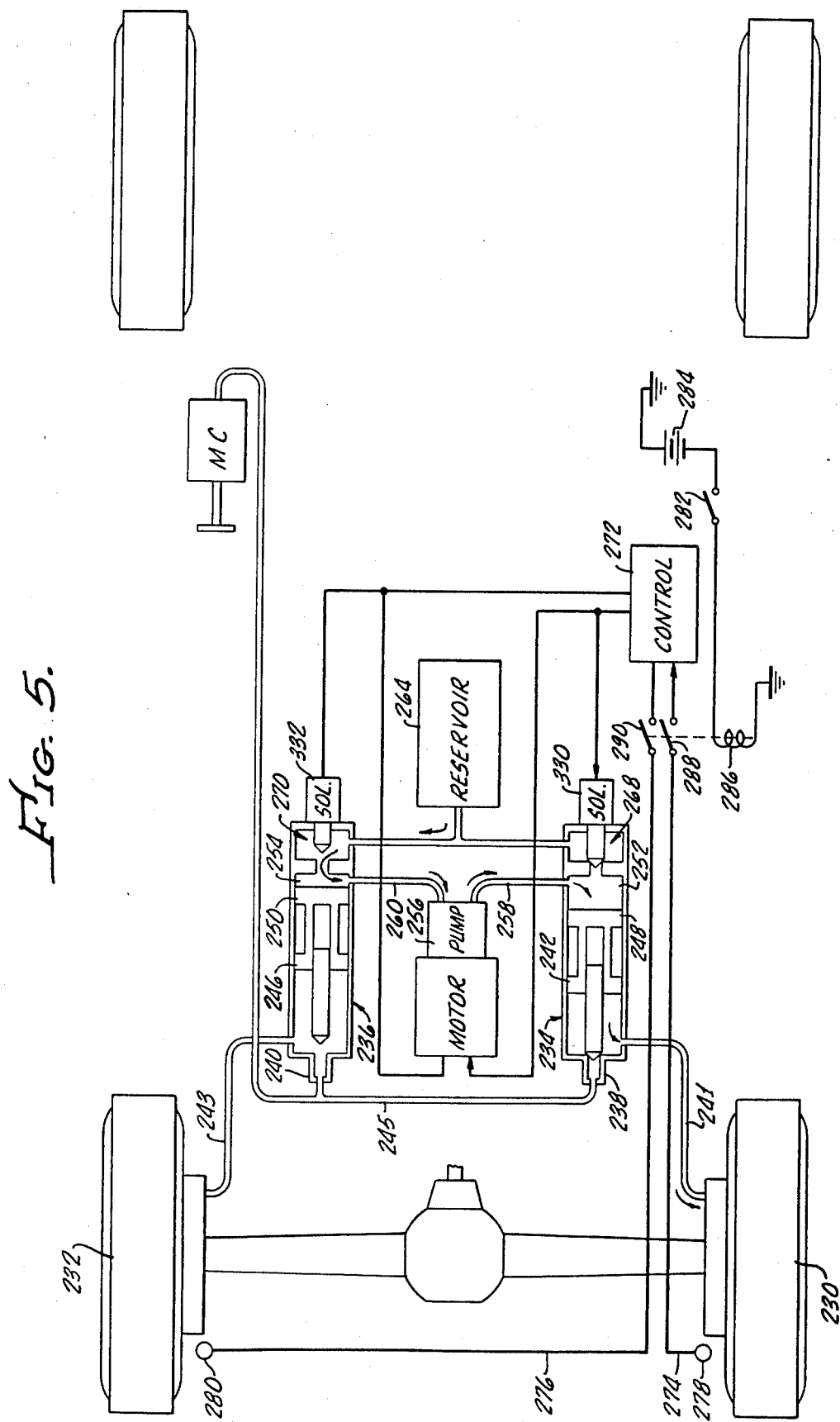
FIG. 5 is a schematic illustration of a modification of the system of FIG. 1.

Illustrated in FIGS. 5-10 is a modified form of the described anti-spin system. FIG. 5 is a schematic diagram of the components illustrated structurally in FIGS. 6-10. The modified system employs substantially the same anti-spin cylinder arrangements, and their connections, as the system described in FIGS. 1-4, but differs primarily in the mode of actuation of the pistons of these cylinders. Thus, pressurized fluid is applied to wheel cylinders of wheels 230, 232 (FIG. 5) via anti-spin cylinders 234, 236, having input ports 238, 240 adapted to be closed by actuation of pistons 242, 246, respectively, all substantially as described in connection with the embodiment of FIGS. 1-4.

Pistons 242, 246 are actuated by drive pistons 248, 250, respectively, mounted in drive cylinders 252, 254 which receive pressurized fluid from a reversible pump 256 connected to the cylinders 252 and 254 via conduits 258, 260. A fluid flow path between the pump 256 and a fluid reservoir 264, is completed through the cylinders 252 and 254 via solenoid-operated valves 268, 270. These valves are functionally analogous to the three-way solenoid valves 70, 72 of FIG. 1, and are individually operated from the output of a control 272 which receives input signals via lines 274, 276 from wheel velocity sensors 278, 280. As before, the system may be enabled or disabled by operation of a manual switch 282 feeding power from a battery 284 to a coil 286 which, when energized, closes a pair of ganged switches 288, 290 in the lines 274, 276 between the sensors and the control.

In the system shown in FIG. 5, solenoid valves 268 and 270 are normally open and, as in the prior system, an anti-spin pistons 242, 246 are resiliently retained in retracted (unpressurizing) position to allow free fluid flow from the master cylinder through the anti-spin cylinders to the wheel cylinders. On sensing of a selected magnitude of rotational velocity difference between the two wheels, control 272 energizes one or the other of solenoids 268, 270 and also initiates operation of the pump in one or the other of its two directions. For example, if wheel 230 is spinning, the control actuates solenoid 268 to close this valve and the pump is operated to provide pressurized fluid to drive cylinder 252 via conduit 258, drawing fluid from the reservoir through still open solenoid 270 and the unactuated drive cylinder 254. This configuration selectively and uniquely drives the piston 248 of drive cylinder 252 to thereby drive the piston 242 of the anti-spin cylinder 234 to its pressurizing position. As previously described, this operation of the anti-spin piston drives its valve operator so that it will close the input port to the cylinder. Fluid from the master cylinder is blocked and the piston is caused to pressurize the anti-spin cylinder and thereby apply pressurized fluid to the wheel cylinder of wheel 230. Similarly, should the sensors indicate that wheel 232 is spinning, the control will close valve 270 while valve 268 remains open. The control also drives the pump in the other direction to cause pressurized fluid to be applied by the pump and, via conduit 260, to the drive cylinder 254.

Figure 8:
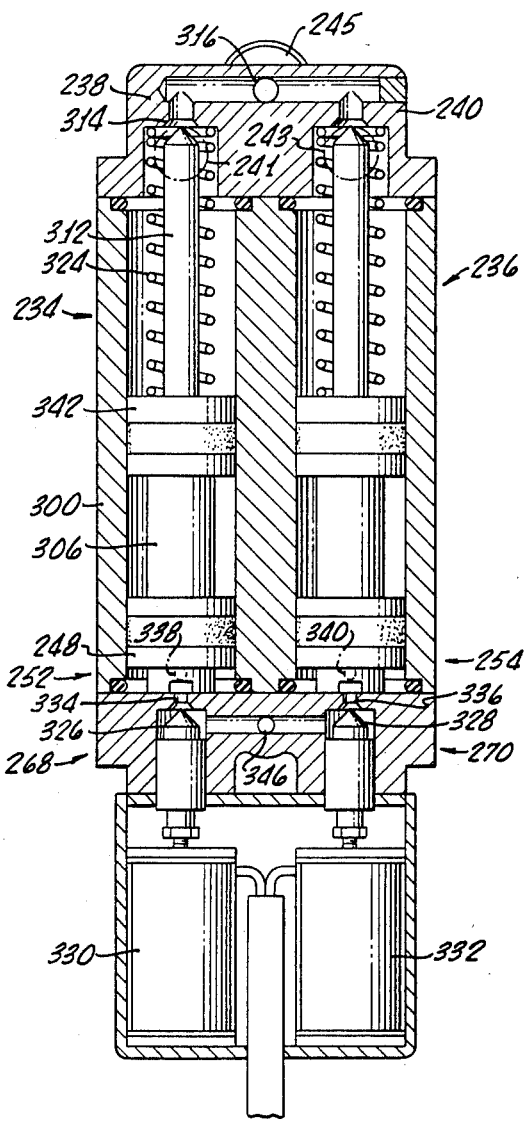
FIGS. 8 and 9 are front elevational views of the apparatus of FIG. 6 showing the anti-spin cylinders in position of normal operation in FIG. 8, and with one anti-spin cylinder actuated in FIG. 9.
Figure 9:
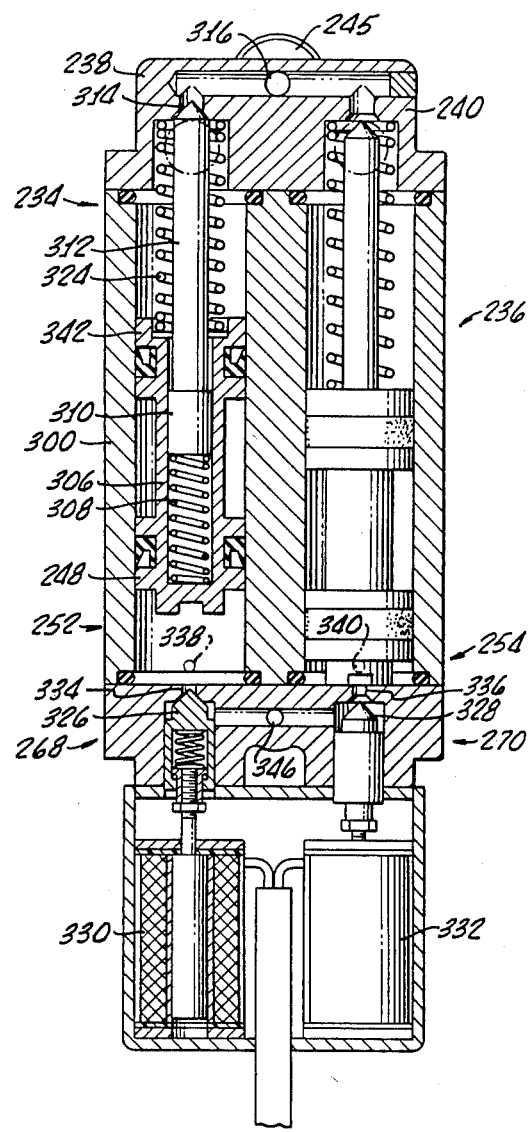
Figure 10:
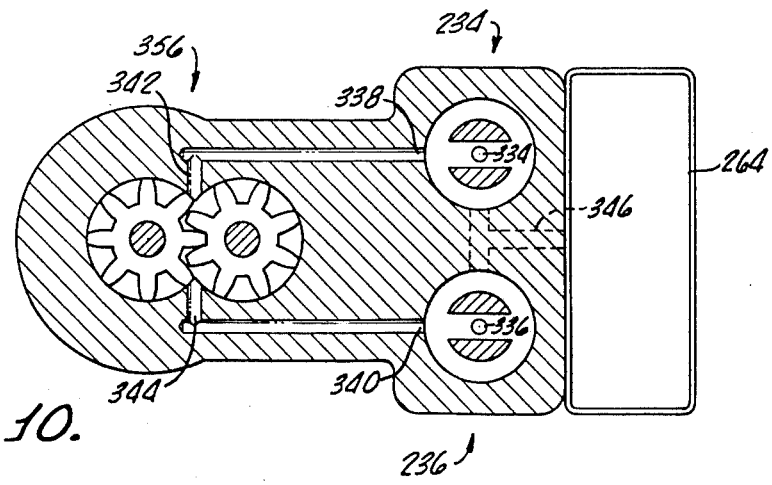
FIG. 10 is a sectional view showing the fluid flow paths between the pump and drive cylinders of the apparatus of FIGS. 6–9.

As shown in FIGS. 6-10, the two anti-spin cylinders 234 and 236 are mounted together in a integral body, and the drive cylinders 252, 254 are integrally formed with the respective anti-spin cylinders. Because the two cylinder assemblies are identical, only one need be described. Thus, anti-spin cylinder 234 includes an elongated body 300, slideably and sealably mounting both the anti-spin piston 242 and the drive piston 248 which are integrally connected to one another by an intermediate shaft 306. A spring 308, mounted within the bore of the hollow piston assembly 242, 248, 306, engages one end of a valve operator 310 which is slidably mounted within the hollow piston assembly. The valve operator includes an operator rod portion 312 having a conical end surface that is adapted to seal the input port 314 of the anti-spin cylinder. The input ports of the two anti-spin cylinders are connected to each other and to a common conduit 316 which connects to the master cylinder. As previously described, the same end portions of these anti-spin cylinders include output ports 318, 320 which connect to the respective wheel cylinders. The anti-spin cylinder includes a piston return spring 324 that drives the pistons of both the anti-spin cylinder and drive cylinder toward an inactive or unpressurizing position. FIG. 9 illustrates the anti-spin cylinder 234 and its drive cylinder 252 in pressurizing position, and also illustrates the anti-spin cylinder 236 and its drive cylinder 254 nearly at unpressurizing position. Solenoid-operated valves 268, 270 include valve operators 326, 328 connected to be driven by solenoids 330, 332 so as to close ports 334, 336 formed in the ends of the drive cylinders 252 and 254. Ports 338, 340 formed in the same ends of these drive cylinders are connected to opposite sides of the pump 256 via conduits 342, 344, respectively, as best seen in FIG. 10. Input ports 334, 336 of the drive cylinders are connected to a common conduit 346 which is connected to the reservoir 264.

With the anti-spin system of FIGS. 5-10 disabled, or with the wheels 230 and 232 rotating with a speed differential less than a predetermined minimum, the anti-spin and drive cylinders are in the position illustrated in FIG. 8, with both solenoid valves 268, 270 in open position and with both anti-spin cylinder input ports open to thereby allow normal pedal-controlled braking operation. With the system enabled by closing of manual switch 282 (FIG. 5), and with wheel 230, for example, spinning at a rate 20% or more greater than the rate of wheel 232, the control will send a signal to the pump and to valve 268, closing port 334 and driving pump 256 in a direction that will apply pressurized fluid via conduit 342 to port 338 of drive cylinder 252. Accordingly, piston 248, together with the integrally connected piston 242 are driven to the pressurizing position illustrated in FIG. 9. This both closes the input port 314 to the cylinder 334 and pressurizes the brake fluid confined therein to thereby apply pressurized fluid via port 318 and conduit 241 to the spinning wheel 230.

The vacuum-operated system of FIGS. 1-4 is preferred for application in vehicles where a source of adequate vacuum is available, and where very large anti-spin braking forces are not required. For those applications where a vacuum source is not available, or where the vehicle requires relatively high anti-spin braking forces, the reversible pump-driven system of FIGS. 5-10 is preferred. Both systems provide compactly packaged, self-contained arrangements that may simply and readily be retrofitted to existing vehicles. The self-contained, compact package of the embodiment of FIGS. 1-4 includes accumulator, diaphragm and valves. Obviously, the sensors must include components located at the wheels or wheel axles, and the control may be located at any convenient position in the vehicle. Similarly, the compact package of the embodiment of FIGS. 5-10 includes anti-spin and drive cylinders, pump and reservoir which may be readily mounted or retrofitted to a vehicle at a convenient location, preferably relatively close to the driven wheels. Both systems are simple, relatively inexpensive to manufacture and maintain, have few moving components that may give rise to problems, and thus are highly reliable and have a long life. The systems introduce no additional problems to a normal braking system and, moreover, may be readily overriden by normal application of pressurized fluid from the master cylinder. The use of the double-acting diaphragm or the reversible pump ensures that an anti-spin braking force cannot be applied to both wheels simultaneously.

The foregoing detailed description is to be clearly understood as given by way of illustration and example only, the spirit and scope of this invention being limited solely by the appended claims.

We claim:

1. In a vehicle having a pair of power wheels driven by differential gearing, a wheel brake cylinder for braking each wheel, and a master cylinder for applying pressure to said brake cylinders, an improved anti-spin system comprising first and second spin controls connected between said master cylinder and respective ones of said brake cylinders, each said spin control comprising,
an anti-spin cylinder having an input port at one end thereof connected to said master cylinder and an output port connected to said wheel brake cylinder,
anti-spin piston means mounted in said anti-spin cylinder for motion between a cylinder pressurizing position and an unpressurized position,
valve closure means responsive to motion of said piston means toward said cylinder pressurizing position for closing said input port, said valve closure means comprising a valve operator shiftably carried by said piston means for motion toward and away from said input port, spring means on said piston means for urging said valve operator away from said piston means and toward said input port, said valve operator having an end remote from said piston means adapted to seat upon and close said input port as said piston means moves toward said pressurizing position,
sensing means for measuring rotational speed of said wheels, and
means responsive to said sensing means for driving one of said piston means toward its cylinder pressurizing position.

2. The apparatus of claim 1 wherein said piston means comprises an elongated tubular body having a bore closed at one end and open at the other end, said valve operator being slidably mounted in said bore for motion longitudinally of said body and having a free end extending from said bore, said free end having a port closure face adapted to close said input port.

3. The apparatus of claim 1 wherein said input and output ports are on the same side of said piston means, whereby pressure applied at said input port tends to drive said piston means toward said unpressurizing position.

4. The apparatus of claim 1 wherein said means for driving one of said pistons comprises a driving member, said piston means each having a driving section projecting from its anti-spin cylinder to respectively opposite sides of said driving member, and means for driving said driving member in one direction or the other to move one or the other of said piston means toward its cylinder pressurizing position.

5. The apparatus of claim 1 wherein said means for driving one of said piston means comprises a diaphragm housing having first and second housing walls, a diaphragm extending across said housing for defining first and second pressure chambers betweeen said diaphragm and said first and second housing walls, respectively, means for differentially pressurizing said first and second chambers to drive said diaphragm in one direction or the other, said piston means of said first spin control including means responsive to motion of said diaphragm in one direction for driving the piston means towards its cylinder pressurizing position, the piston means of said second spin control including means responsive to motion of the diaphragm in the other direction for driving said last-mentioned piston means towards its unpressurized position.

6. The apparatus of claim 5 wherein said diaphragm includes a rigid central section having first and second sides in said first and second chambers, respectively, said first side of said diaphragm central section being in abutment with the piston means of said first spin control and being spaced from the piston means of said second spin control when said diaphragm is driven in said one direction, said second side of said central section of the diaphragm being in abutment with the piston means of said second spin control and being displaced from the piston of said first spin control when said diaphragm is driven in the other direction.

7. The apparatus of claim 5, including an accumulator housing defining an accumulator chamber therein, said accumulator housing including first and second sections positioned adjacent to and on opposite sides of said diaphragm housing, means for controlling pressure within said accumulator chamber, first valve means connected with said accumulator chamber for controlling pressure within said first diaphragm chamber, and second valve means connected with said accumulator chamber for controlling pressure within said second diaphragm chamber.

8. The apparatus of claim 5 wherein the anti-spin cylinder of said first spin control comprises a cylinder body having a first end thereof connected to said first housing wall, said cylinder body projecting from said diaphragm housing, said input and output ports being formed in a second end of said cylinder body remote from said diaphragm housing, said piston means of said first spin control comprising an elongated piston body slidably mounted in said cylinder body and extending through said first cylinder end into said first diaphragm chamber.

9. The apparatus of claim 5, including an accumulator housing having first and second sections positioned adjacent to and on opposite sides of said diaphragm housing, the anti-spin cylinders of said first and second spin controls each comprising a cylinder body having an end connected to respective walls of said diaphragm housing and extending, respectively, along and closely adjacent to said first and second accumulator sections, a master cylinder conduit adapted to be connected to a master cylinder at one end thereof and having the other end connected to said input port of said first anti-spin cylinder, and a coupling conduit having one end connected to said master cylinder conduit adjacent the input port of said first anti-spin cylinder, said coupling conduit extending through said accumulator housing and around said diaphragm housing and having the other end thereof connected to the input port of said second anti-spin cylinder.

10. The apparatus of claim 9, including first and second solenoid controlled valves mounted on said first and second accumulator sections, respectively, means for fluid coupling said first and second valves to said accumulator, means for coupling said valves, respectively, to said first and second diaphragm chambers, and means for venting said valves to atmosphere.

11. The apparatus of claim 1 wherein said means for driving said piston means comprises a drive cylinder having a piston connected to said anti-spin piston means, a pump for pressurizing said drive cylinder, and valve means responsive to said sensing means for controlling pressure within said drive cylinder.

12. The apparatus of claim 1 wherein said means driving one of said piston means comprises first and second drive cylinders having first and second pistons connected respectively to said anti-spin piston means of said first spin control and to said anti-piston means of said second spin control, each said drive cylinder including a first and second port, first and second valve means for opening or closing the first port of each of said drive cylinders, respectively, a reversible pump connected to supply pressurized fluid to one or the other of said second ports of said drive cylinders and to withdraw fluid from the other of said second ports of said first and second drive cylinders, a fluid reservoir, means for coupling said reservoir to said first ports of said first and second drive cylinders through said first and second valves, and means responsive to said sensing means for closing one or the other of said valves and actuating said pump to supply pressurized fluid to the drive cylinder of which the valve is closed.

13. For use with a vehicle having a pair of power wheels driven by differential gearing, a wheel brake cylinder for braking each wheel and a master cylinder for applying pressurized fluid to said brake cylinders, an improved anti-spin system comprising
  a diaphragm housing,
  a diaphragm secured to and within said housing and extending across the housing to divide the interior of the housing into first and second diaphragm pressure chambers,
  a first anti-spin cylinder connected to said housing and extending outwardly therefrom in a first direction,
  a second anti-spin cylinder connected to said housing and extending outwardly therefrom in a second direction opposite said first direction,
  first and second pistons mounted in said first and second anti-spin cylinders for motion between pressurizing and unpressurizing positions,
  means for urging said pistons toward said unpressurizing positions
  sensing means for measuring rotational speed of said power wheels,
  means responsive to said sensing means for controlling pressure in said first and second diaphragm pressure chambers to drive said diaphragm in either said first direction or said second direction,
  means responsive to motion of said diaphragm in said first direction for driving said first piston towards said pressurizing position,
  means responsive to motion of said diaphragm in said second direction for driving said second piston toward its pressurizing position, and
  means responsive to motion of said pistons toward pressurizing positions for individually applying pressurized fluid to a respective one of said wheel cylinders.

14. The apparatus of claim 13 wherein each said anti-spin cylinder has an input port connected to said master cylinder and an output port connected to a respective one of said wheel braking cylinders, and means in each of said first and scond anti-spin cylinders responsive to motion of the respective pistons toward pressurized position for closing the input port of the respective anti-spin cylinder.

15. The apparatus of claim 13 wherein said first piston comprises a piston head section slidably sealed to and within said first anti-spin cylinder and a piston drive section, said piston drive section extending through said first anti-spin cylinder and through said diaphragm pressure chamber into abutment with one side of said diaphragm.

16. The apparatus of claim 15 wherein each anti-spin cylinder has an input port connected to said master cylinder, and wherein said first piston includes a longitudinally extending piston bore extending through said piston head section and opening into the interior of said first anti-spin cylinder, an elongated valve operator slidably mounted in said piston bore, means in said piston bore for resiliently urging said valve operator towards said input port of said first anti-spin cylinder, and means on an end of said valve operator remote from said piston for closing said last-mentioned input port when said piston is moved toward said pressurizing position.

17. The apparatus of claim 15 wherein said second piston includes a second piston head section slidably sealed to and within said second anti-spin cylinder and a second piston drive section extending from said anti-spin cylinder and through said second diaphragm pressure chamber, said second piston drive section including means adapted to contact one side of said diaphragm whereby when said diaphragm is driven in said second direction said second piston is driven toward its pressurizing position.

18. The apparatus of claim 13 including input and output ports in said first anti-spin cylinder, and including a valve operator shiftably carried by said first piston for motion toward and away from said input port, means for urging said valve operator away from said first piston and toward said input port, said valve operator having an end remote from said first piston adapted to seat upon and close said input port as said piston means moves toward its pressurizing position.

19. For use with a vehicle having a pair of power wheels driven by differential gearing, a wheel brake cylinder for braking each wheel, and a master cylinder for applying pressure to said brake cylinder, an anti-spin system comprising a diaphragm housing having first and second housing walls, a diaphragm mounted within said housing and extending completely across the housing between said walls to divide the housing into first and second diaphragm pressure chambers, first and second anti-spin cylinders fixed to and extending outwardly from said first and second housing walls, respectively, first and second pistons within said respective anti-spin cylinders and adapted to be driven by motion of said diaphragm in first and second directions, respectively, each said anti-spin cylinder including an input port adapted to be connected to said master cylinder and an output port adapted to be connected to a respective one of said wheel brake cylinders, means in said anti-spin cylinders responsive to motion of said pistons for closing the input port of the respective anti-spin cylinders, an accumulator housing having a first outwardly opening transverse recess receiving a portion of said diaphragm housing, said accumulator housing including a longitudinally extending, outwardly opening recess receiving said first and second anti-spin cylinders, respectively, first valve means for alternatively coupling said first diaphragm pressure chamber with atmosphere or with the interior of said accumulator, second valve means for alternatively coupling the second diaphragm pressure chamber with atmosphere or with the interior of said accumulator, means for providing decreased pressure in said accumulator, means for sensing rotational speed of said wheels, and means responsive to said speed sensing means for actuating one or the other of said valve means to drive said diaphragm in said first or second directions.

20. In a vehicle having a pair of power wheels driven by differential gearing, a wheel brake cylinder for braking each wheel, and a master cylinder for applying pressure to said brake cylinders, an anti-spin system comprising first and second anti-spin cylinders each having an input port connected to the master cylinder and an output port adapted to be connected to a respective one of the wheel brake cylinders, first and second anti-spin piston means mounted in respective ones of said anti-spin cylinders for motion between pressurizing and unpressurizing position, means responsive to motion of each said piston means toward its pressurizing position for closing the input port of the respective anti-spin cylinder, first and second drive cylinders respectively having first and second drive pistons connected to respective ones of said anti-spin piston means, reversible pump means coupled with said drive cylinders for selectively pressurizing one or the other of said drive cylinders, means for sensing rotational velocity of said wheels, and means responsive to said velocity sensing means for driving said pump means in one direction or the other to flow pressurizing fluid to one or the other of said drive cylinders to actuate one or the other of said drive pistons.

21. The apparatus of claim 20 wherein said means responsive to said velocity sensing means comprises a fluid reservoir, first and second fluid conduits connected between said reservoir and respective ones of said drive cylinders, first and second valves connected in said first and second conduits for respectively blocking or permitting fluid flow through said conduits, third and fourth conduits connected between said reversible pump means and respective ones of said drive cylinders, and means for closing one or the other of said valves when said pump means is driven in one direction or the other.

22. In a vehicle having a pair of power wheels driven by differential gearing, a wheel brake cylinder for braking each wheel, and a master cylinder for applying pressure to said brake cylinders, an anti-spin system comprising first and second anti-spin cylinders each having an input port connected to the master cylinder and an output port adapted to be connected to a respective one of the wheel brake cylinders, first and second anti-spin piston means mounted in respective ones of said anti-spin cylinders for motion between pressurizing and unpressurizing position, means responsive to motion of each said piston means toward its pressurizing position for closing the input port of the respective anti-spin cylinder, first and second drive cylinders respectively having first and second drive pistons connected to respective ones of said anti-spin piston means, reversible pump means for selectively pressurizing one or the other of said drive cylinders, means for sensing rotational velocity of said wheels, and means responsive to said velocity sensing means for driving said pump means in one direction or the other to effect the pressurization of one or the other of said drive cylinders, said means responsive to said velocity sensing means comprising a fluid reservoir, first and second fluid conduits connected between said reservoir and respective one of said drive cylinders, first and second valves connected in said first and second conduits for respectively blocking or permitting fluid flow through said conduits, third and fourth conduits connected between said reversible pump means and respective ones of said drive cylinders, and means for closing one or the other of said valves when said pump means is driven in one direction or the other, said first anti-spin cylinder comprising a cylinder body, said first anti-spin piston means comprising a piston head mounted in said cylinder body, said first drive cylinder comprising a portion of said cylinder body on the side of said first piston head remote from said input and output ports of said first anti-spin cylinder, a second piston head connected to said first piston head within said second portion of said cylinder body, said pump means being connected to pressurize said cylinder body between said second head and an end of said cylinder body remote from said input and output ports of said first anti-spin cylinder.

* * * * *